US006158527A

United States Patent [19]

Juuri et al.

[11] Patent Number: 6,158,527

[45] Date of Patent: Dec. 12, 2000

[54] TOOL OF A BREAKING APPARATUS

[75] Inventors: Kauko Juuri, Hollola; Jouni Salo, Lahti, both of Finland

[73] Assignee: Tamrock Oy, Tampere, Finland

[21] Appl. No.: 09/201,496

[22] Filed: Nov. 30, 1998

Related U.S. Application Data

[63] Continuation-in-part of application No. 08/776,801, filed as application No. PCT/FI95/00411, Aug. 2, 1995, abandoned.

[30] Foreign Application Priority Data

Sep. 8, 1994 [FI] Finland .................................... 943683

[51] Int. Cl.$^7$ ...................................................... B23B 51/00

[52] U.S. Cl. ............................ 173/128; 173/90; 173/171; 408/226; 279/19.6

[58] Field of Search ............................. 173/128, 90, 171, 173/114; 408/226; 279/19.1, 19.2, 19.3, 19.4, 19.5, 19.6, 19.7

[56] References Cited

U.S. PATENT DOCUMENTS

| | | | |
|---|---|---|---|
| D. 45,277 | 2/1914 | Vaughan . | |
| 628,455 | 7/1899 | French . | |
| 1,463,848 | 8/1923 | Shimin . | |
| 2,498,114 | 2/1950 | Penrod . | |
| 3,333,490 | 8/1967 | Popin | 408/226 |
| 4,491,444 | 1/1985 | Rumpp et al. | 173/114 |
| 4,565,472 | 1/1986 | Brennsteiner et al. | 279/19.5 |
| 4,624,323 | 11/1986 | Burrola . | |
| 4,850,758 | 7/1989 | Morgan | 408/226 |
| 5,341,710 | 8/1994 | Peuterbaugh . | |
| 5,513,714 | 5/1996 | Downie et al. . | |
| 5,526,723 | 6/1996 | Sormunen et al. . | |
| 5,536,344 | 7/1996 | Van Dreumel . | |
| 5,674,032 | 10/1997 | Slocum et al. | 408/226 |

FOREIGN PATENT DOCUMENTS

| | | |
|---|---|---|
| 0 344 121 | 11/1989 | European Pat. Off. . |
| 2140/65 | 12/1970 | Finland . |
| 1761459 | 9/1992 | Russian Federation . |
| 327 374 | 8/1968 | Sweden . |
| 386 394 | 8/1976 | Sweden . |

*Primary Examiner*—Scott A. Smith

*Attorney, Agent, or Firm*—John Smith-Hill; Smith-Hill and Bedell

[57] ABSTRACT

An impact breaker has a sleeve which slidably receives an end portion of a tool. The tool is formed over its end portion with a groove extending completely around the end portion of the tool for receiving lubricant for lubricating movement of the tool in the sleeve.

18 Claims, 2 Drawing Sheets

TOOL OF A BREAKING APPARATUS

CROSS-REFERENCE TO RELATED APPLICATION

This application is filed as a continuation-in-part of patent application Ser. No. 08/776,801, now abandoned, which was filed as entry into the national phase of International Application No. PCT/FI95/00411 filed Aug. 2, 1995. The entire disclosure of International Application No. PCT/FI95/00411, published as International Publication WO 96/05023, is hereby incorporated by reference herein.

BACKGROUND OF THE INVENTION

The invention relates to a tool of a breaking apparatus, such as a percussion hammer or percussion drill, especially for improving the lubrication of the tool.

A conventional impact breaker or breaking apparatus includes a hydraulic or pneumatic percussion hammer which includes a frame formed with a cylinder containing a percussion piston and a sleeve for receiving a proximal or inner end portion of a tool with an end face of the tool presented toward the piston. The proximal end portion of the tool is releasably fitted in the sleeve and is held by one or more retaining pins which allow limited linear movement of the tool relative to the sleeve. The breaking apparatus also includes valving which controls supply of operating fluid to the cylinder for repeatedly driving the piston to strike the tool. The tool also has a distal or outer end portion for engaging material to be broken. The percussion hammer may be embodied in a portable breaking apparatus, such as a hydraulic hand breaker or pneumatic drill, or it may be attached to a power-driven carrier, such as an excavator.

The proximal end portion of a tool used in a conventional breaking apparatus is surrounded by a substantially smooth surface. In order to work advantageously, the joint by which the tool is mounted to the frame requires lubrication between the sleeve and the tool. In order to provide the lubrication between the tool and the sleeve, the latter is at least partly grooved on the surface touching the tool, whereupon it is possible to substantially decrease the running of the lubricant away from the surfaces to be lubricated during the use of the breaking apparatus, and to spread the lubricant more evenly between the different parts of the joint surfaces.

The purpose of the present invention is to eliminate prior art drawbacks and to provide an improved tool of a breaking apparatus which is easier to use and by means of which the lubrication of the joint between the breaking apparatus and the tool is ameliorated.

SUMMARY OF THE INVENTION

According to the invention, a grooving is formed on the outer surface of the tool of the breaking apparatus, near the tool end to be attached to the breaking apparatus, in order to advantageously lubricate the joint surfaces between the tool and the breaking apparatus. The grooving is formed of grooves circling the outer surface of the tool in at least one direction, and the grooves circling the outer surface of the tool in the same direction during the rotation of the tool with respect to the vertical axis are preferably situated at substantially equal intervals from one another.

According to the invention, the grooves formed in the tool of the breaking apparatus circle the outer surface of the tool in such a way that the angle of elevation measured from the horizontal plane is between 0 and 45 degrees, preferably between 10 and 25 degrees. The grooving formed in the tool consists of grooves that are preferably placed crosswise with respect to each other and that circle the outer surface of the tool in different directions in such a way that grooves running parallel during the rotation of the tool around the vertical axis are situated at substantially equal intervals from one another. The grooves formed in the tool may also be mutually parallel, whereupon the angle of elevation is 0 degrees.

When the angle of elevation of the grooves formed in the tool of the breaking apparatus is more than 0 degrees, the grooves are preferably made to begin at substantially equal intervals from one another from the tool end to be attached to the breaking apparatus. The accuracy of the mutual positioning of the grooves in the tool can be advantageously improved in such a way that grooves that circle the tool in opposite directions during the rotation of the tool around the vertical axis are made to begin from substantially the same point situated on the edge of the tool end to be attached to the breaking apparatus.

According to the invention, the grooves formed in the tool of the breaking apparatus preferably cover the tool over a distance the length of which is 0.5 to 2 times the diameter, calculated from the tool end to be attached to the breaking apparatus, when this end is substantially circular. When the tool end to be attached to the breaking apparatus substantially differs from circular, i.e. it has for example the shape of a polygon, the grooves formed, in the tool cover the tool over a distance the length of which is 0.5 to 2 times the longest interval running through the center of the tool end to be attached to the breaking apparatus between two points situated on the perimeter of the same tool end, the distance being calculated also from the same tool end. However, the grooves formed on the outer surface of the tool of the breaking apparatus according to the invention and beginning from the tool end to be attached to the breaking apparatus preferably cover only the part entering the breaking apparatus when the tool is being attached thereto.

By forming the grooving according to the invention on the outer surface of the tool of the breaking apparatus substantially near the end to be attached to the breaking apparatus, the lubricant for the joint surfaces between the tool and the breaking apparatus can be preferably supplied in such a way that the lubricant is spread substantially evenly onto the grooving of the tool. The lubricant is then also made to spread substantially evenly onto the corresponding joint surface of the breaking apparatus. Furthermore, by means of the invention it is possible to reduce the costs of manufacturing the joint between the breaking apparatus and the tool, since it is easier to form a grooving on the outer surface of the tool than on the inner surface of the connecting piece of the breaking apparatus.

BRIEF DESCRIPTION OF THE DRAWINGS

In the following, the invention will be described in greater detail with reference to the accompanying drawing, in which.

DETAILED DESCRIPTION

Figure 1:
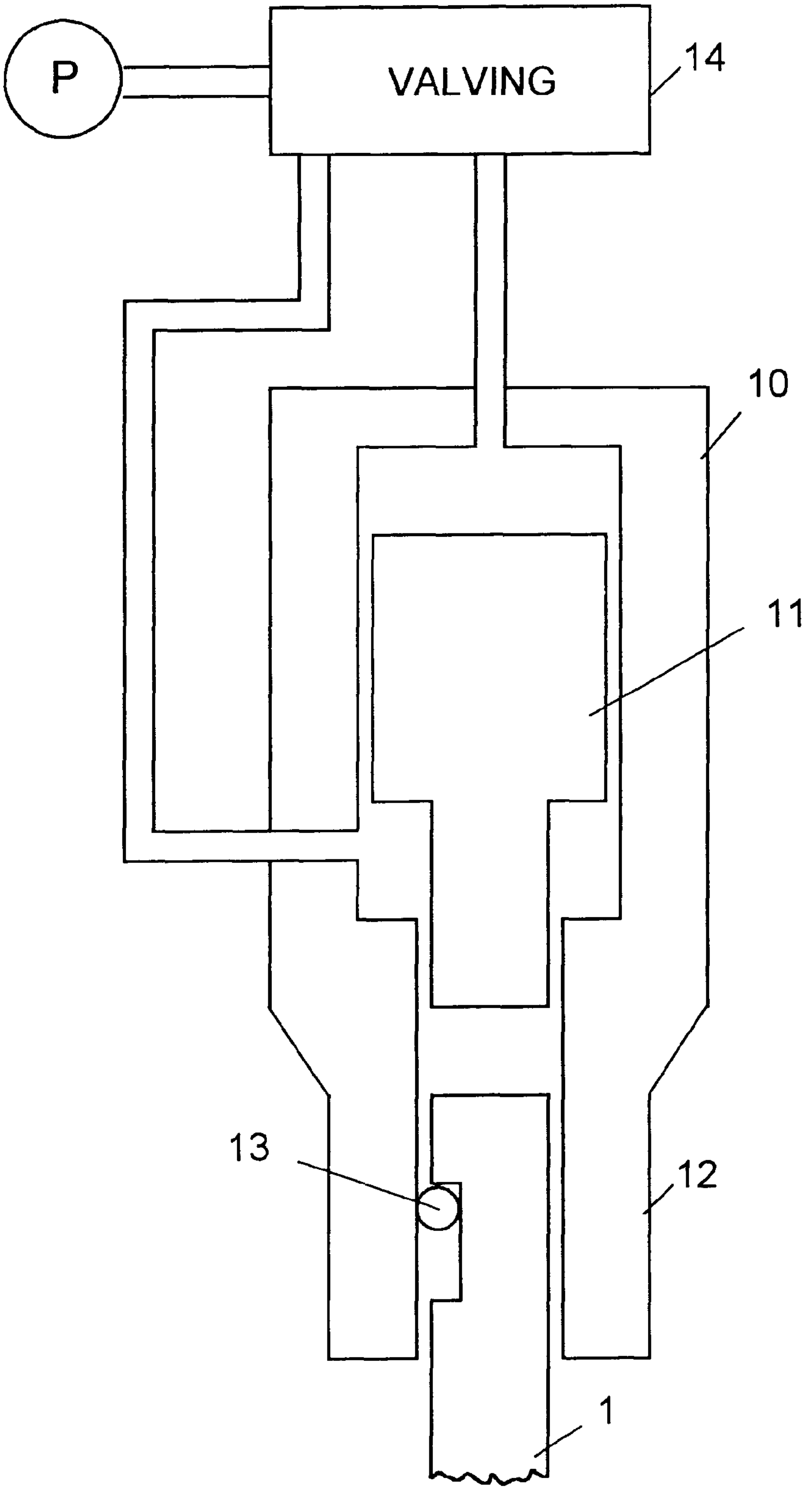
FIG. 1 illustrates schematically a percussion hammer.

The percussion hammer illustrated in FIG. 1 comprises a frame 10 defining a cylinder which guides movement of an impact piston 11. The frame includes a sleeve 12 receiving a proximal end portion of a tool 1 which is slidable within the sleeve through a range of movement limited by a retaining pin 13. The cylinder is connected to a source of fluid under pressure through a control valve 14. The control valve 14 supplies fluid to the cylinder and vents fluid from the cylinder in a manner such that the piston is repeatedly driven to strike the tool and is then returned to its starting position.

Figure 2:
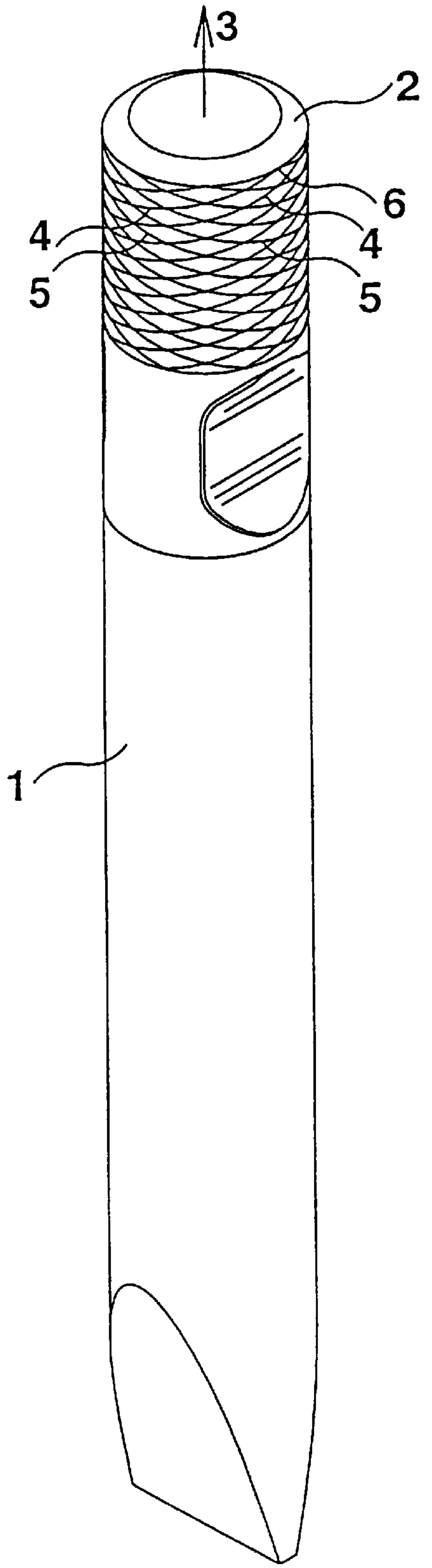
FIG. 2 shows a first tool for attachment to the percussion hammer.

According to FIG. 2, the tool 1 of the breaking apparatus comprises grooves 4 and 5 circling the tool 1 in different directions of rotation, clockwise and counterclockwise, with respect to the central axis 3 of the tool, the grooves being formed to begin from the tool end 2 to be attached to the breaking apparatus. The grooves 4 circling clockwise and correspondingly the grooves 5 circling counterclockwise are mutually substantially parallel, and are inclined to a plane perpendicular to the central axis 3 at 15 degrees. The grooves 4 and 5 begin preferably in pairs in such a way that both a groove 4 circling clockwise and a groove 5 circling counterclockwise with respect to the central axis 3 of the tool are made to begin from substantially the same point 6 situated on the perimeter of the tool end 2 to be attached to the breaking apparatus.

Figure 3:
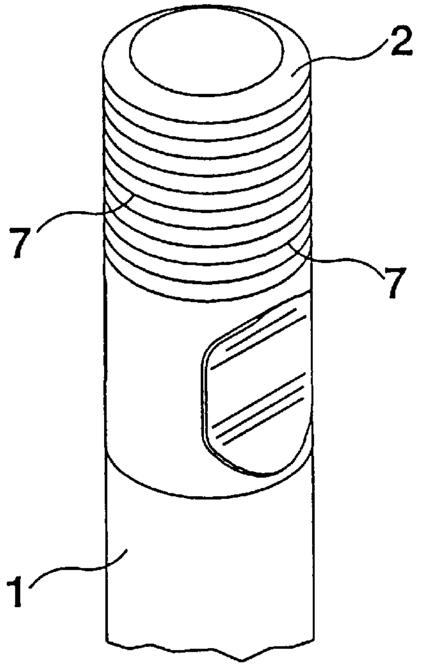
FIG. 3 shows the proximal end portion of a second tool.

In FIG. 3, substantially mutually parallel grooves 7 that are preferably situated at equal intervals from one another are formed on the outer surface of the tool 1 substantially near the tool end 2 to be attached to the breaking apparatus.

Figure 4:
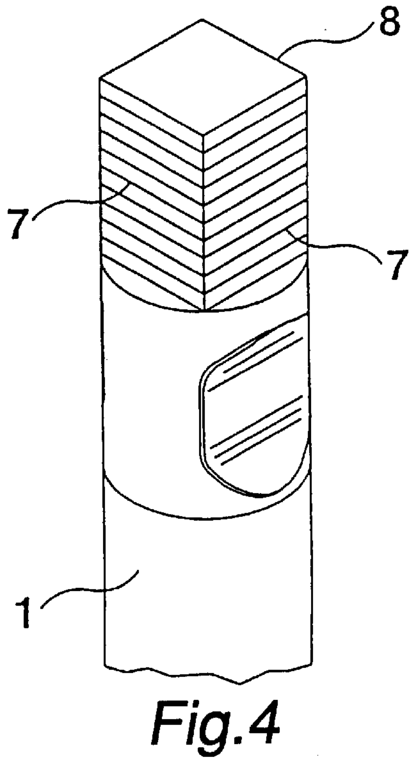
FIG. 4 shows a proximal end portion of a third tool.

The embodiment of FIG. 4 differs from the embodiment of FIG. 3 in that the mutually parallel grooves 7 are formed around the end 8 of the tool 1 to be attached to the breaking apparatus, the end having a cross-section that substantially differs from circular.

It will be appreciated that the invention is not restricted to the particular embodiment that has been described, and that variations may be made therein without departing from the scope of the invention as defined in the appended claims and equivalents thereof.

What is claimed is:

1. A breaking apparatus comprising a sleeve and a tool having an end portion received in the sleeve and slidable within the sleeve over a limited range of linear movement, wherein the tool is formed over said end portion with a groove extending completely around said end portion of the tool for receiving lubricant for lubricating sliding movement of the tool in the sleeve.

2. A breaking apparatus according to claim 1, wherein said end portion of the tool has a central axis and the groove is inclined to a plane perpendicular to said central axis at an angle of up to 45 degrees.

3. A breaking apparatus according to claim 2, wherein said angle is in the range from 10 to 25 degrees.

4. A breaking apparatus according to claim 1, wherein said end portion of the tool has a central axis and the tool is formed over said end portion with first and second grooves inclined to a plane perpendicular to said central axis and of the same hand.

5. A breaking apparatus according to claim 4, wherein the first and second grooves have turns that are substantially uniformly spaced along said end portion of the tool.

6. A breaking apparatus according to claim 1, wherein said end portion of the tool is substantially circular in cross section and has a central axis and the groove is inclined to a plane perpendicular to said central axis and is formed over a length of the tool from 0.5 to 2 times diameter of the circular cross section.

7. A breaking apparatus according to claim 1, wherein the end portion of the tool is substantially uniform in cross section over its length and has a central axis and the groove is inclined to a plane perpendicular to said central axis and is formed over a length of the tool from 0.5 to 2 times the length of the longest line segment joining two points on perimeter of the substantially uniform cross section and intersecting the central axis of the end portion.

8. A breaking apparatus comprising a sleeve and a tool having an end portion received in the sleeve and slidable within the sleeve over a limited range of linear movement, wherein the end portion of the tool has a central axis and the tool is formed over said end portion with at least first and second grooves each extending completely around said end portion for receiving lubricant for lubricating sliding movement of the tool in the sleeve, the first and second grooves being inclined to a plane perpendicular to said central axis and being of opposite hand.

9. A breaking apparatus according to claim 8, wherein each groove is inclined to said plane at an angle in the range from 10 to 25 degrees.

10. A breaking apparatus according to claim 8, wherein the first and second grooves have turns that are substantially uniformly spaced along said end portion of the tool.

11. A breaking apparatus according to claim 8, wherein said end portion of the tool is substantially circular in cross section and each groove is formed over a length of the tool from 0.5 to 2 times diameter of the circular cross section.

12. A breaking apparatus according to claim 8, wherein the end portion of the tool is substantially uniform in cross section over its length and each groove is formed over a length of the tool from 0.5 to 2 times the length of the longest line segment joining two points on perimeter of the substantially uniform cross section and intersecting the central axis of the end portion.

13. A breaking apparatus according to claim 8, wherein the end portion of the tool has an end face and the first and second grooves start at substantially the same point on the periphery of said end face.

14. A breaking apparatus according to claim 8, wherein the first and second grooves are inclined to said plane at substantially equal angles.

15. A breaking apparatus comprising a sleeve and a tool having an end portion received in the sleeve and slidable within the sleeve over a limited range of linear movement, wherein the tool is formed over said end portion with at least one endless groove extending completely around said end portion for receiving lubricant for lubricating sliding movement of the tool in the sleeve.

16. A breaking apparatus according to claim 15, wherein the tool is formed over said end portion with a plurality of endless grooves extending completely around said end portion and spaced apart along said end portion for receiving lubricant.

17. A breaking apparatus according to claim 16, wherein said end portion of the tool is substantially circular in cross section and the grooves are distributed over a length of the tool from 0.5 to 2 times the diameter of said circular cross section.

18. A breaking apparatus according to claim 16, wherein the end portion of the tool is elongate and is substantially uniform in cross section over its length and the grooves are distributed over a length of the tool from 0.5 to 2 times the length of the longest line segment joining two points on perimeter of the substantially uniform cross section of the end portion and intersecting the central axis of the end portion.

* * * * *

UNITED STATES PATENT AND TRADEMARK OFFICE

CERTIFICATE OF CORRECTION

PATENT NO. : 6,158,527

DATED : December 12, 2000

INVENTOR(S) : Kauko Juuri, et. al.

It is certified that error appears in the above-identified patent and that said Letters Patent is hereby corrected as shown below:

Title page, item [30], "Sep. 8, 1994 [FI] Finland 943683" should be deleted and replaced with --Aug. 9, 1994 [FI] Finland 943683--.

Signed and Sealed this

First Day of May, 2001

Attest:

Nicholas P. Godici

NICHOLAS P. GODICI

*Attesting Officer*

*Acting Director of the United States Patent and Trademark Office*